UNITED STATES PATENT OFFICE.

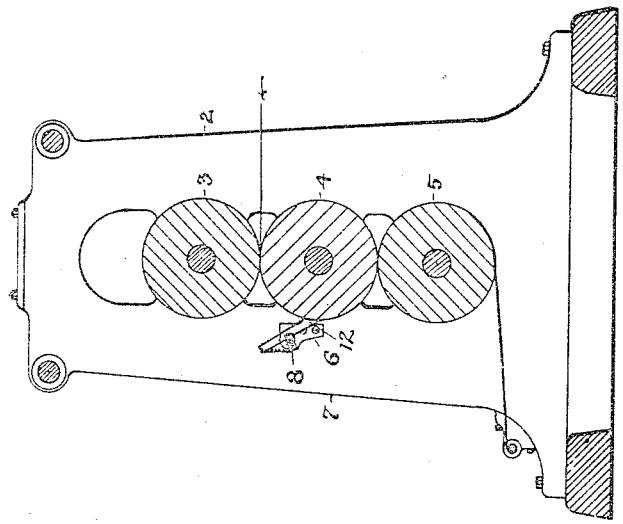
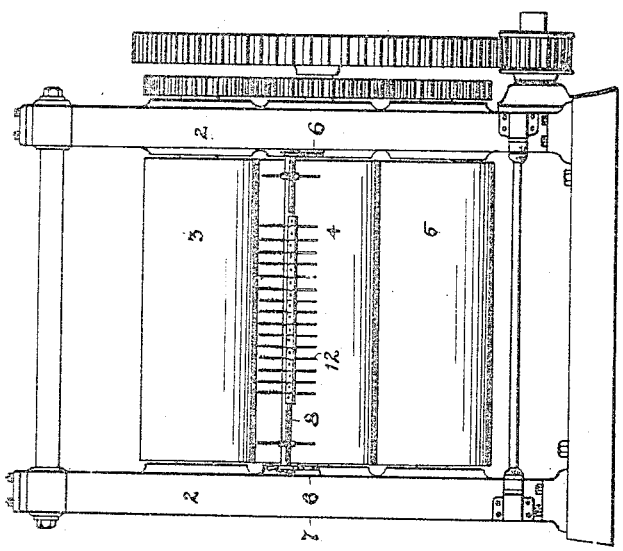

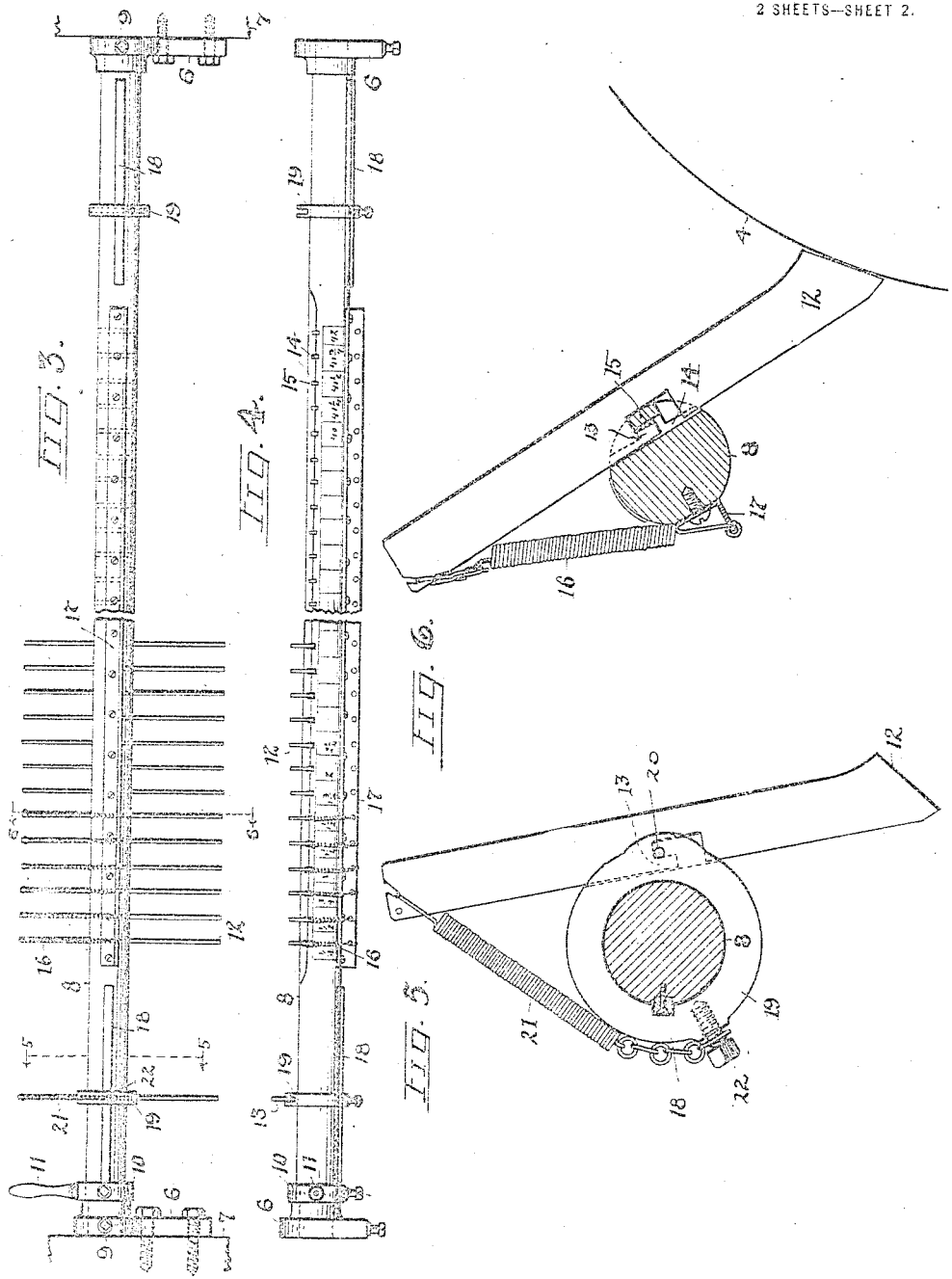

ROBERT BUTLER AND EDGAR A. TINSMAN, OF BARBERTON, OHIO.

CUTTING ATTACHMENT FOR CALENDERING-MACHINES.

1,245,190.   Specification of Letters Patent.   Patented Nov. 6, 1917.

Application filed November 29, 1915. Serial No. 64,048.

*To all whom it may concern:*

Be it known that we, ROBERT BUTLER and EDGAR A. TINSMAN, citizens of the United States, residing at Barberton, in the county of Summit and State of Ohio, have invented certain new and useful Improvements in Cutting Attachments for Calendering-Machines, of which the following is a specification.

This invention relates to a cutting attachment for calendering machines, and comprises a mounting adapted to be fixed upon a calendering machine and carrying a series of cutters for cutting the rubber stock into strips of any desired width as it passes through and around the calendering rollers.

In the accompanying drawings, Figures 1 and 2 are reduced side and sectional views, respectively, of a calendering machine and the cutting attachment mounted thereon. Figs. 3 and 4 are enlarged front and plan views, respectively, of the cutting attachment apart from the machine. Figs. 5 and 6 are still larger views in cross section on lines 5—5 and 6—6, respectively, of Fig. 3.

The calendering machine shown illustrates one type of such machine in use comprising a main frame 2 having three calendering rollers, 3, 4 and 5 geared to operate together for calendering rubber stock or fabrics. The present conception is to provide a cutter-attachment for the calendering machine wherewith the rubber stock can be cut into strips of any desired width as the rubber stock is run through the calendering machine and using one of the calendering rollers to co-act with the cutting knives. For this purpose two plates or brackets 6 are bolted upon the inner or opposed faces of the main frame standards 7, and a cross shaft 8 is journaled at its ends within said brackets and prevented from turning or rotating by set screws 9. However, a collar 10 having a handle 11 is fixed upon the shaft 8 to turn the same for different settings or to retire the cutter 12 from the work altogether. Shaft 8 extends across the full width of the machine parallel with the middle calendering roller 4 and closely adjacent thereto, and a series of cutters 12 are detachably secured in uniformly spaced relations upon one side of said shaft by means of a hook 13 formed in one edge of the cutter bar and transverse slots 14 formed in the shaft to provide a straddle-rest 15 for each hook. The shaft is also channeled lengthwise to produce the straddle-rests 15.

Each cutter is slightly widened at its lower or cutting end, and the upper end notched to detachably hold one end of a coiled spring 16 which is hinged or flexibly connected at its lower end to an angle-bar 17 secured to the shaft. In this way, each cutter is held under spring tension in working engagement with the rounded surface of the calendering roller 4 and the slot 14 for each cutter permits slidable movement of the cutter but no lateral or twisting play. All or any number of the cutters may be employed at one time dependent upon the number of width of strips to be cut.

The end portions of shaft 8 are round and provided with splines or keys 18 to secure a set of collars 19 slidably in place thereon, and each collar 19 is slotted in part and provided with a cross pin 20 to hook a cutter bar 13 thereupon in substantially the same way as upon the shaft, and a coiled spring 21 secured to the cutter and to a set screw 22 provides a substantially similar yielding connection for the cutter as hereinbefore described. This arrangement permits convenient and accurate adjustment of two end cutters on the shaft therewith to cut the rubber stock or sheet to correspond in width to that of the fabric passing through the machine independently of or in conjunction with all or any number of cutters mounted upon the central portion of the shaft.

What we claim is:

1. A cutting attachment for calendering machines, a shaft having transverse slots at one side thereof, cutting blades having hooks at their edges to seat within said slots, and a spring connection between said shaft and the ends of said blades.

2. A cutting attachment for calendering machines having a shaft adapted to be turned and provided with a series of transverse slots in the side thereof, and a series of parallel cutters removably engaged at their inner edges between their ends in the said slots.

3. A cutting attachment for calendering machines comprising a shaft having a set of collars mounted for longitudinal adjustment thereon, in combination with cutters having hooked engagement with said collars, and springs to hold said cutters in cutting engagement with the work.

4. In a calendering machine, a shaft having a series of transverse slots at spaced intervals in the periphery thereof, having rests across the same, cutters removably and slidably engaged in said slots and having hooks engaged on said rests, and springs connected with the outer ends of said cutters.

5. A cutting attachment for calendering machines, comprising a shaft and a series of transverse slots in the side thereof and integral rests across the outer portions of said slots, in combination with cutters seated in said slots between their ends and having hooks in their edges engaged over said rests.

In testimony whereof we affix our signatures.

ROBERT BUTLER.
EDGAR A. TINSMAN.